June 6, 1961
L. F. BENDER
2,987,065
MILK LINE CLEANSING SYSTEM
Filed Sept. 12, 1958
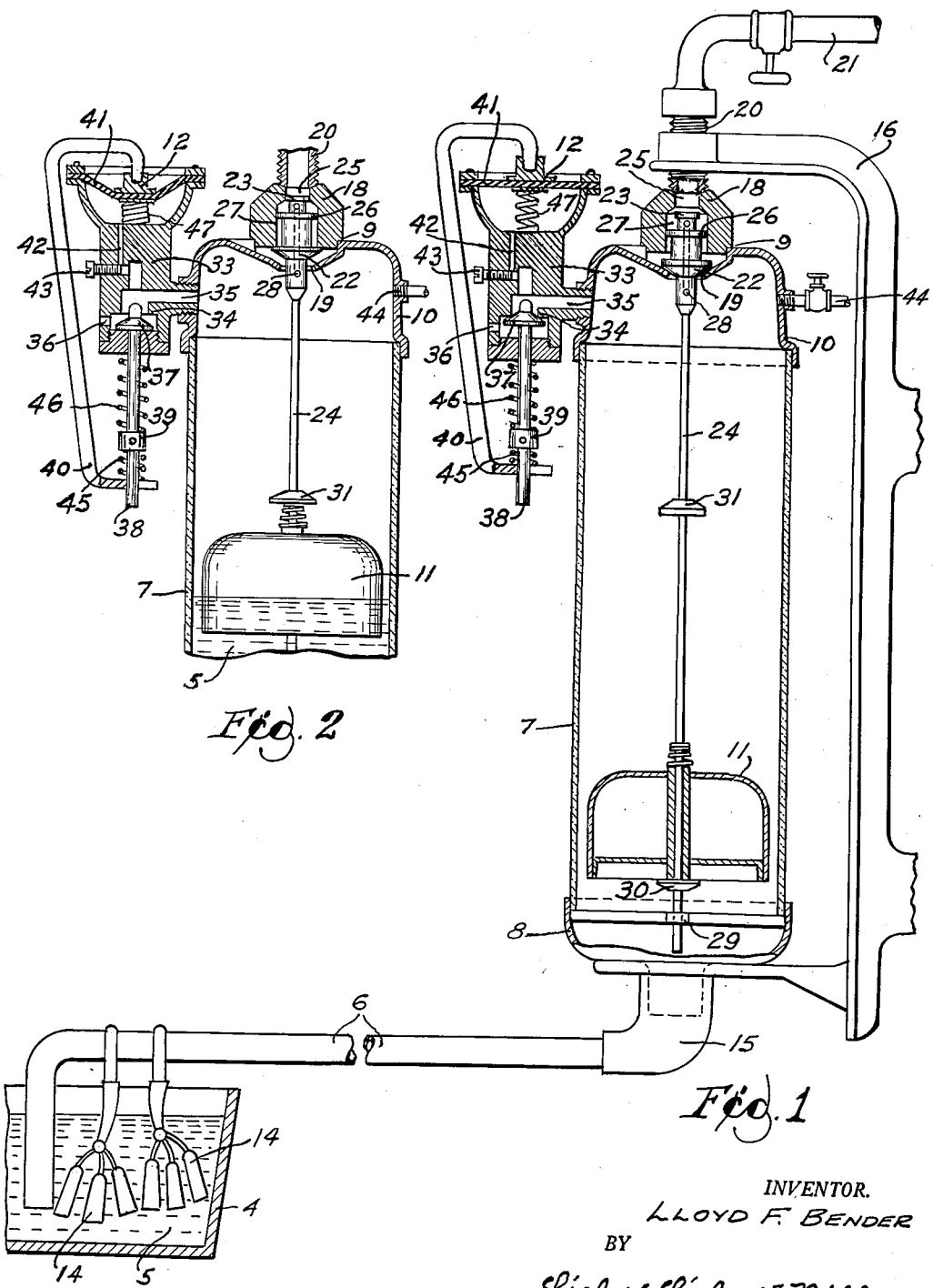
INVENTOR.
LLOYD F. BENDER
BY
Lieber, Lieber & Nilles
ATTORNEYS

# United States Patent Office 2,987,065
Patented June 6, 1961

2,987,065
MILK LINE CLEANSING SYSTEM
Lloyd F. Bender, Rte. 2, Hayward, Wis.
Filed Sept. 12, 1958, Ser. No. 760,700
4 Claims. (Cl. 134—56)

This invention relates generally to improvements in the art of maintaining dairy equipment in clean and sanitary condition, and it relates more specifically to an improved system for washing and sterilizing the milk conducting lines employed in dairies to transport such liquid from one locality to another.

The primary object of the present invention is to provide an improved system for effectively cleansing and sterilizing the milk transporting pipe lines normally used in dairies to conduct bulk milk from place to place.

It is common practice in the dairy industry to transfer milk derived from milking machines or storage receptacles to coolers or other containers located remote from the sources of supply, through pipe lines of diverse lengths. When no milk is normally being transported through these pipe lines, it is customary to immerse one end of each line in cleansing and sterilizing liquid and to connect the other pipe line end with a washing unit adapted to cause the cleansing liquid to surge back and forth through the intervening line.

In one of these commercial washing units, the liquid surging action is effectively produced with the aid of liquid receptacle having its interior conected to the end of the pipe line remote from the cleansing liquid supply, and which is alternately communicable with a vacuum source and with the ambient atmosphere to cause the cleansing liquid to flow back and forth through the conducting line, as in Patent No. 2,829,657 granted April 8, 1958. While this type of pipe line washer has proven highly satisfactory and successful in extensive commercial use, difficulty has been encountered in some installations especially where the pipe lines are of great length, in the matter of insuring complete drainage of polluted cleansing liquid from within these lines after each withdrawal of this liquid from the supply source into the long pipe lines. Although some attempts have heretofore been made to obviate this difficulty, these have not been successful since they introduced undesirable complications in the pipe line cleansing equipment.

It is therefore an important object of this invention to provide an improved milk line cleansing system wherein the pipe line being cleaned is effectively drained after each surge of sterilizing and washing liquid therethrough.

Another important object of the invention is to provide a simple accessory applicable as an attachment to a dairy equipment cleaner such as disclosed in the prior patent above referred to, and which functions to positively prevent accumulation of polluted cleansing liquid in milk conducting lines being washed by such cleaners.

A further important object of this invention is to provide an improved vacuum actuated auxiliary valve assemblage cooperable with the main control valve and liquid flow regulating receptacle of a milking machine parts washer so as to insure pulsation of clean washing and sterilizing liquid through the elements being washed.

Still another important object of the present invention is to provide an improved washing system for the bulk milk transporting lines of a dairy which may be readily manipulated by simple adjustments of parts to produce a drainage time lag which prevents washing liquid from accumulating and becoming polluted and confined within pipe lines of various lengths.

These and other more specific objects and advantages of the invention will be apparent from the following detailed description.

A clear conception of the features constituting the present improvement and of the construction and operation of the elements involved in a system for commercially exploiting the invention, may be had by referring to the drawing accompanying and forming a part of this specification in which like reference characters designate the same or similar parts in the various views.

FIG. 1 is a somewhat diagrammatic central vertical section through the various elements of a typical dairy equipment washing system having a relatively long liquid transfer line, only a fragment of which has been illustrated, and showing the auxiliary pipe drainage delay valve closed by air pressure but about to open by vacuum so as to admit air to the surge producing receptacle; and FIG. 2 is a similarly diagrammatic but fragmentary section of the same washing unit shown in FIG. 1, but depicting the drainage regulating valve opened by a spring.

While the invention has been illustrated and described herein as having been embodied in a pipe line cleansing system comprising an auxiliary time lag line drainage control valve actuated by a bellows which functions in response to variations in pressure within the washer unit, it is not intended to limit the improvement to the use of such a valve assemblage; and it is also contemplated that specific descriptive terms employed herein be given the broadest possible interpretation consistent with the actual disclosure.

Referring to the drawing, the improved milk line cleansing system illustrated, comprises in general, a tank 4 or other source containing an abundant supply of washing and sterilizing liquid 5; an elongated slightly inclined liquid conducting pipe line 6 normally used to transfer bulk milk from one locality to another, but having its lower end constantly immersed either directly or indirectly within the supply liquid 5 during each cleansing operation; an elongated upright liquid receptacle 7 having a lower end closure 8 connected to and in open communication with the upper end of the pipe line 6; a main liquid flow control valve assemblage 9 associated with an upper end closure 10 of the receptacle 7, and being operable by a float 11 responding to the rise and fall of liquid within this receptacle to cause liquid 5 from the tank 4 to alternately flow back and forth through the pipe line 6; and an auxiliary valve assemblage 12 also associated with the upper closure 10 and being operable by variations in pressure within the receptacle 7 to insure complete drainage of liquid 5 from within the pipe line 6 after each upward flow of such liquid from the tank 4 into the receptacle 7.

The tank 4 may be located at any suitable place either close to or remote from the liquid receptacle 7, but must contain an abundance of sterile liquid 5 which should be periodically replenished to maintain it in sanitary condition, and the lower end of the pipe line 6 adjacent to this tank may be either directly and alone immersed in the liquid 5, or through intervening milking machine parts 14, or both directly and through suspended parts 14 as illustrated in FIG. 1. The upper end of the pipe line 6 remote from the tank 4 and which is normally connected to the milking machine or other source of milk supply, may be detachably secured to the lower closure 8 of the receptacle 7 by means of a rubber elbow 15 or otherwise, and the receptacle 7 may be mounted upon a supporting frame or bracket 16 and usually comprises a transparent tube which is detachably confined and clamped between the lower and upper end caps or closures 8, 10.

The main liquid flow control valve assemblage 9 comprises a centrally bored clamping block 18 coacting with the upper closure 10 above an atmosphere air inlet valve seat 19 formed in this closure, and which block is clampingly engaged by a nipple 20 screw threaded in the bracket 16 and connecting the bore of the block 18 with a source of vacuum through a valve controlled duct 21; and lower and upper valves 22, 23 respectively secured to the upper enlarged end of an upright rod 24 which is longitudinally reciprocable by the float 11, and of which the lower disk valve 22 is cooperable with the seat 19 while the upper piston valve 23 is cooperable with a bore 25 in the block 18 communicating with the vacuum source through the nipple 20 and duct 21. The upper enlarged rod end is also provided with an annular flange 26 located between the valves 22, 23 and which is slidably cooperable with a larger bore 27 in the block 18, and a passage 28 formed in this enlarged rod end connects the portion of the bore 27 between the valve 23 and flange 26 with the interior of the receptacle 7. The lower end of the rod 24 coacts with a guide 29 and the medial rod portion is provided with lower and upper stops 30, 31 respectively between which the float 11 is vertically movable, and these stops may be made relatively adjustable.

The auxiliary valve assemblage 12 comprises a casing 33 having therein a valve seat 34 constantly exposed on one side to the interior of the receptacle 7 through a conduit 35 while its opposite side is adapted to be placed in communication with the ambient atmosphere through an opening 36 by means of a disk valve 37 cooperable with the seat 34 and which is secured to a vertically reciprocable stem 38. The valve stem 38 is guided for reciprocation in the casing 33 and has an adjustable abutment 39 thereon with which one end of a link 40 is cooperable through a light spring 45 to close the valve 37, and the abutment 39 is also engaged by a heavier spring 46 which tends to open the valve 37. The opposite end of the link 40 is connected to the outer face of a flexible diaphragm 41, the periphery of which is sealingly secured to the casing 33, and the inner face of which is connected with the conduit 35 by a port 42, the effective area of which can be varied by a screw 43. The diaphragm 41 may be formed of flexible rubber and is forced to assume a flat condition as in Fig. 1 by a spring 47 when the internal and external air pressures acting thereon are equalized, but this diaphragm 41 will flex as in FIG. 2 when its inner face is exposed to vacuum from within the receptacle 7. The upper closure 10 of the receptacle 7 may also be provided with a valve controlled rinsing liquid supply pipe 44.

When the improved pipe line washing and sterilizing equipment has been constructed and installed as above described, the system functions as follows. The valve in the pipe 44 should be closed while the valve in the vacuum duct 21 should be open, and the tank 4 should be provided with sufficient cleansing liquid 5 to maintain the lower end of the pipe line 6 and any milking machine parts 14 associated with this pipe line end immersed within the liquid 5 at all times. With the float 11 resting upon the lower stop 30 on the rod 24 and before cleansing liquid 5 has been drawn into the receptacle 7 through the pipe line 6, the air inlet disk valves 22, 37 will be closed while the vacuum controlling piston valve 23 will be open and the diaphragm 41 will be in flat condition as illustrated in FIG 1, thereby subjecting the interior of the receptacle to vacuum through the bores 25, 27 and the passage 28 in the rod 24.

With the parts in this condition, cleansing liquid 5 from the tank 4 will be forced by atmospheric pressure to flow through the pipe line 6 and milking machine parts 14 into the lower portion of the receptacle 7 past the elbow 15, thereby causing the float 11 to rise. When the float 11 has been elevated sufficiently to engage the upper stop 31 on the rod 24 as in FIG. 2, the vacuum control valve 23 will close and the air admission valve 22 will simultaneously open so as to establish atmospheric pressure within the receptacle 7. While the receptacle 7 is thus being supplied with a batch of cleansing liquid sufficient to actuate the valves 22, 23, the inner face of the diaphragm 41 will also be gradually subjected to vacuum through the conduit 35 and the restricted port 42 so that this diaphragm will slowly flex and compress the spring 47 thereby permitting the spring 46 to gradually open the air inlet valve 37 simultaneously with the opening of the main air admission valve 22, as illustrated in FIG. 2.

This interruption of the vacuum and establishment of atmospheric air pressure within the liquid laden receptacle 7, promptly causes the liquid 5 from within this receptacle to descend and surge back into the tank 4 through the pipe line 6 thereby lowering the float 11 along the rod 24 which remains in raised position when the float is moving toward the lower stop 30. While the float 11 is thus descending both the main and the auxiliary air inlet valves 22, 37 remain open as in FIG. 2, but when the liquid level within the receptacle 7 drops sufficiently to cause the float 11 to bear against the lower stop 30, the valve 22 closes and the vacuum valve 23 opens, but the auxiliary air inlet valve 37 remains open to provide a time lag while atmospheric pressure is being slowly re-established on the inner face of the diaphragm 41 through the restricted port 42. But when the air pressure acting on the opposed faces of the diaphragm is almost equalized, the spring 47 cooperates with the resilient diaphragm 41 to quickly close the valve 37 with a snap action thereby preventing further admission of air into the float chamber. This delay in closing of the valve 37 produces a time lag sufficient to enable all of the liquid 5 within the pipe line 6 to drain back into the tank 4 before washing liquid is again sucked or drawn into the receptacle 7 by the subsequent vacuum established therein.

This drainage of the cleansing liquid from within the pipe line 6 and from any accessories associated with the lower end thereof, is of utmost importance in order to prevent unsanitary liquid 5 from becoming trapped within the line 6 during successive cleansing cycles, and the duration of the time lag can be varied to conform with pipe lines 6 of various lengths by merely adjusting the screw 43 so as to vary the effective area of the port 42 communicating with the interior of the bellows 41. Whenever the inner face of the diaphragm 41 is being subjected to vacuum the air admission valve 37 opens gradually due to the resistance offered by the spring 47; and while the initial closing movement of this valve 37 is gradual when producing the drainage time lag, its final closing is produced with a snap action. The position of the abutment 37 relative to the stem 38 may be varied with the aid of a set screw so as to vary the action of the springs 45, 46 and to also insure proper closing of the valve 37.

This washing and sterilizing cycle will be effected automatically whenever the system is functioning as above described, and when a pipe line 6 has been properly cleansed, the operation of the washing unit may be arrested by merely closing the control valve in the vacuum duct 21. If so desired, rinsing liquid may thereafter be admitted to the receptacle interior by opening the control valve in the supply pipe 44, and the fresh liquid thus introduced will flush the interiors of the receptacle 7, elbow 15 and pipe line 6 as well as the float 11, and associated parts. The washing unit may also be quickly and conveniently dismantled by merely releasing the block clamping nipple 20 whereupon the block 18, receptacle end closures 8, 10, and the float rod 24 with the associated parts may be removed and likewise easily dismantled by merely releasing the flexible rubber bellows 41. After thorough cleaning and inspection, all of the dismantled parts may obviously be just as readily reassembled.

From the foregoing detailed description, it should be apparent that the present invention in fact provides an improved and simplified system whereby milk transporting pipe lines 6 of any length may be effectively cleansed by causing washing and sterilizing liquid to alternately flow back and forth through these lines any desired number of times while positively preventing accumulation of contamined liquid within the lines. This advantageous result is obtained by merely providing a time lag valve assemblage 12 associated directly with a relatively standard float actuated milking machine parts washer, and which is operable by normal variations in pressure existing within the liquid pulsating chamber of the washer. All parts of the improved mechanism may be conveniently adjusted so as to insure accurate and automatic functioning of the system without further attention after proper initial adjustments have been effected. The improved valve assemblage 12 may be readily applied as an accessory directly to the liquid pulsating chambers of various types of washers, and has proven highly satisfactory and successful in actual use.

It should be understood that it is not desired to limit this invention to the exact details of construction and operation of the control valve mechanisms herein specifically shown and described, for various modifications within the scope of the appended claims may occur to persons skilled in the art.

I claim:

1. In a milk conducting line system of the type wherein one end of the line is submerged in liquid while its opposite end is alternately communicable with a vacuum source and with the ambient atmosphere to cause liquid to flow through the line, a liquid receptacle having its interior communicable with the vacuum source and with the liquid supply through the conducting line, an elongated rod reciprocable vertically within said receptacle and having thereon a main liquid flow control valve operable to alternately connect the receptacle interior with the vacuum source when the rod descends and with the ambient atmosphere when the rod ascends, a float coacting with said rod and being operable by the rise and fall of liquid within said receptacle to selectively open and close said control valve, and an auxiliary liquid flow control comprising a secondary valve operable by a flexible bellows exposed on one side to the interior of said receptacle through a restricted orifice and on its opposite side to atmospheric pressure to maintain the receptacle interior connected to the ambient atmosphere for a sufficient length of time to effect complete drainage of cleansing liquid from within the milk conducting line after each closing of the main control valve.

2. In a milk conducting line system of type wherein one end of the line is submerged in liquid while its opposite end is alternately communicable with a vacuum source and with the ambient atmosphere to cause liquid to flow through the line, a liquid receptacle having its interior communicable with the vacuum source and with the liquid supply through the conducting line, an elongated rod reciprocable vertically within said receptacle and having thereon a main liquid flow control valve operable to alternately connect the receptacle interior with the vacuum source when the rod descends and with the ambient atmosphere when the rod ascends, a float coacting with said rod and being operable by the rise and fall of liquid within said receptacle to selectively open and close said control valve, and an auxiliary liquid flow control comprising a secondary valve operable by a flexible bellows exposed on one side to the interior of said receptacle through a restricted orifice and on its opposite side to atmospheric pressure to maintain the receptacle interior connected to the ambient atmosphere for a sufficient length of time to effect complete drainage of cleansing liquid from within the milk conducting line after each closing of the main control valve, and means for varying the effective area of said orifice to cause the auxiliary liqiud flow control valve to effectively cooperate with milk conducting lines of different lengths.

3. In a milk conducting line system of the type wherein one end of the line is submerged in liquid while its opposite end is alternately communicable with a vacuum source and with the ambient atmosphere to cause liquid to flow through the line, a liquid receptacle having its interior communicable with the vacuum source and with the liquid supply through the conducting line, an elongated rod reciprocable within said receptacle, a main valve operable by said rod to alternately connect the receptacle interior with the vacuum source when the rod moves in one direction and with the ambient atmosphere when the rod moves in the opposite direction, a float coacting with said rod and being operable by the rise and fall of liquid within said receptacle to selectively open and close said valve, and an auxiliary liquid flow control comprising a secondary valve operable by a flexible bellows exposed on one side to the interior of said receptacle through a restricted orifice and on its opposite side to atmospheric pressure to maintain the receptacle interior connected to the ambient atmosphere for a sufficient length of time to effect complete drainage of cleansing liquid from within the milk conducting line after each closing of the main control valve.

4. In a milk conducting line system of the type wherein one end of the line is submerged in liquid while its opposite end is alternately communicable with a vacuum source and with the ambient atmosphere to cause liquid to flow through the line, a liquid receptacle having its interior communicable with the vacuum source and with the liquid supply through the conducting line, an elongated rod reciprocable within said receptacle, a main liquid flow control valve operable by said rod to alternately connect the receptacle interior with the vacuum source when the rod moves in one direction and with the ambient atmosphere when the rod moves in the opposite direction, a float coacting with said rod and being operable by the rise and fall of liquid within said receptacle to selectively open and close said control valve, and an auxiliary liquid flow control comprising a secondary valve operable by a flexible bellows exposed on one side to the interior of said receptacle through a restricted orifice and on its opposite side to atmospheric pressure to maintain the receptacle interior connected to the ambient atmosphere for a sufficient length of time to effect complete drainage of cleansing liquid from within the milk conducting line after each closing of the main control valve, and means for varying the effective area of said orifice to cause the auxiliary liquid flow control valve to effectively cooperate with milk conducting lines of different lengths.

References Cited in the file of this patent

UNITED STATES PATENTS

| | | |
|---|---|---|
| 2,690,756 | St. Palley | Oct. 5, 1954 |
| 2,816,558 | Fasth | Dec. 17, 1957 |
| 2,818,076 | Erling | Dec. 31, 1957 |
| 2,897,827 | Dromgold | Aug. 4, 1959 |